United States Patent [19]
Edwards

[11] 3,851,399
[45] Dec. 3, 1974

[54] ALIGNING EQUIPMENT IN SHIPS AND OTHER STRUCTURES

[75] Inventor: Christopher S. Edwards, Hitchin, England

[73] Assignee: British Aircraft Corporation Limited, London, England

[22] Filed: Sept. 14, 1973

[21] Appl. No.: 397,422

Related U.S. Application Data

[62] Division of Ser. No. 254,115, May 17, 1972, abandoned.

[30] Foreign Application Priority Data
May 18, 1971 Great Britain.................... 15591/71

[52] U.S. Cl....................... 33/228, 33/267, 33/290, 33/333
[51] Int. Cl............................ G01c 9/06, G01c 9/26
[58] Field of Search ............. 33/228, 267, 366, 290, 33/333

[56] References Cited
UNITED STATES PATENTS
| | | | |
|---|---|---|---|
| 1,215,425 | 2/1917 | Sperry................................... | 33/267 |
| 2,481,551 | 9/1949 | Williams ............................. | 33/228 |
| 2,592,941 | 4/1952 | Moore ................................. | 33/366 |

Primary Examiner—Harry N. Haroian
Assistant Examiner—Richard H. Stearns
Attorney, Agent, or Firm—Stevens, Davis, Miller & Mosher

[57] ABSTRACT

A method of obtaining information for use in establishing the alignment of equipment on a structure, using instruments each of which has a sensitive axis and gives an electrical signal which, for a range of attitudes, is a function of the magnitude of the angle between that axis and the direction of the earth's gravitational field at any moment.

1 Claim, 3 Drawing Figures

ALIGNING EQUIPMENT IN SHIPS AND OTHER STRUCTURES

This is a division of application Ser. No. 254,115, filed May 17, 1972, now abandoned.

In warships there is a need to align pieces of equipment relatively to one another. For example, gun mountings require to be aligned with a director, that is to say related to the same datum directions in pitch, roll and yaw. The alignment should take place on initial installation, and from time to time thereafter, for example at the end of each refit.

The current practice is to use optical methods for aligning such pieces of equipment, and these optical methods become complex when the pieces are not in direct sight of one another. Usually, therefore, more than one datum plate is installed in a ship. From time to time the alignment of each piece of equipment is checked with reference to whichever of the datum plates is most convenient, but the relative alignment of the datum plates themselves is rarely checked. Nevertheless, this relative alignment can change as a result of deformation of the hull of the ship. This can lead for example to error developing in the alignment of a director on the bridge and an aft gun mounting.

Similar problems can arise with other structures carrying pieces of equipment which require to be aligned.

This invention relates to novel methods for establishing the alignment of equipment on a structure.

Methods according to the present invention use instruments each of which has a sensitive axis and gives an electrical signal which, for a range of attitudes, is a function of the magnitude of the angle between that axis and the direction of the earth's gravitational field at any moment.

The invention will be explained in more detail with reference to the accompanying drawings, which show an example of apparatus according to the invention. In these drawings.

Figure 3:
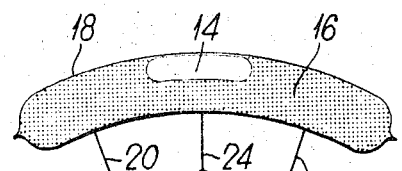
FIG. 3 is a diagram of the interior of one instrument.

In the apparatus shown, there are four instruments 12, each of which is a level of the kind which, as shown in FIG. 3, includes a bubble 14 in a body of electrolyte 16 in a slightly curved enclosure 18, having two end electrodes 20, 22 and a central electrode 24. Preferably the detailed construction of the level is as described in British Patent No. 993,715.

Figure 1:
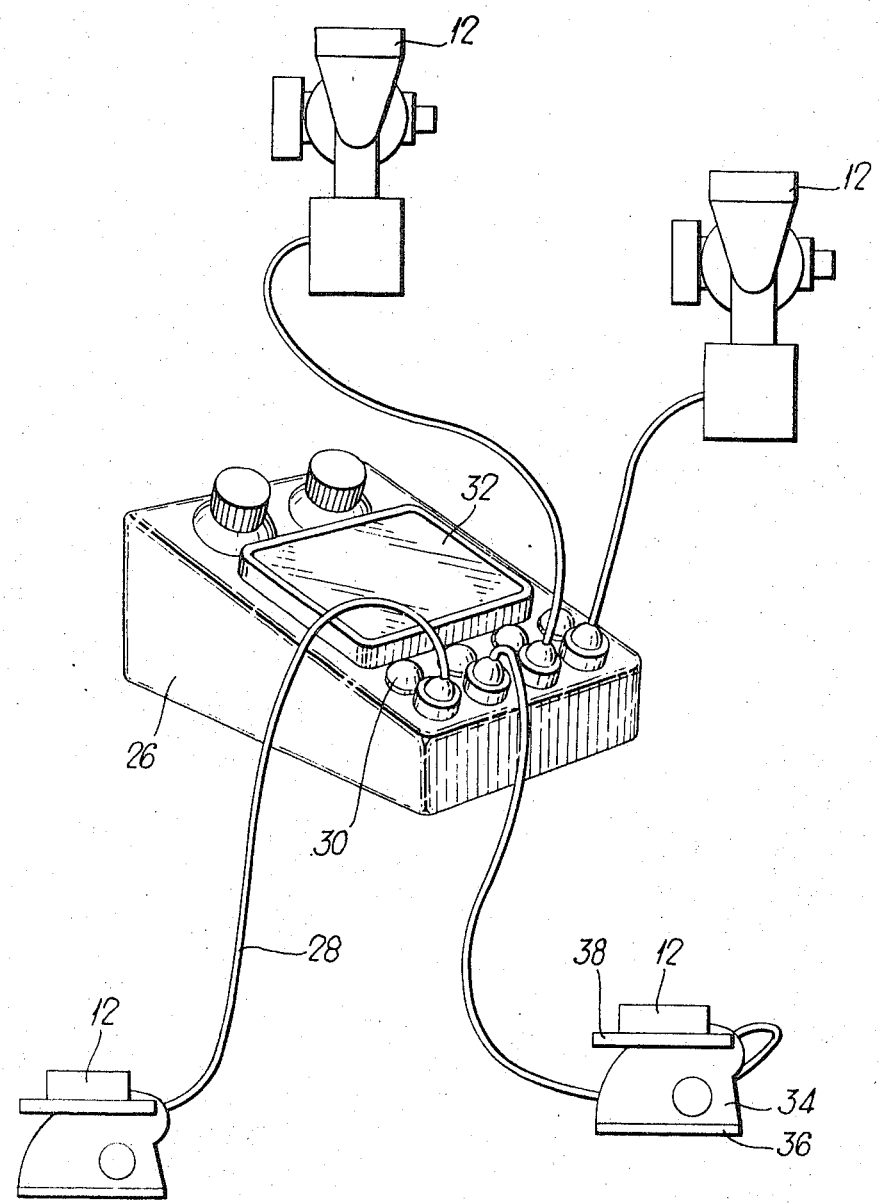
FIG. 1 is a diagrammatic view of the apparatus.

As shown in FIG. 1, the levels 12 are used in conjunction with a central receiver 26, to which they can be connected by flexible leads 28 of any convenient length.

The receiver includes a circuit, the details of which are not part of the present invention, which includes switches controlled by knobs 30, and a meter visible through a window 32. By operation of the switches, the meter can be connected to be actuated either by a signal from a selected one of the levels, or by the signals from a selected two of the levels, in such a way as to display the instantaneous difference of the signals.

It will be apparent that a suitable type of circuit for taking the instantaneous difference of the signals from two levels such as are shown in FIG. 3 is a Wheatstone bridge in which the four limbs are constituted by the left and right halves of two levels.

Two of the levels 12 are mounted on a clinometer. This consists of a base 34 having a flat undersurface 36, and a platform 38 which can be rotated relatively to the base 34 about a horizontal axis, and then locked, the inclination of the platform to the base being indicated by a scale. Such clinometers are well known. The level 12 is fixed on top of the platform, with the sensitive axis of the level (i.e. the direction of length of the enclosure 18) extending in a plane perpendicular to the axis of rotation of the platform 38 relative to the base 34.

Figure 2:
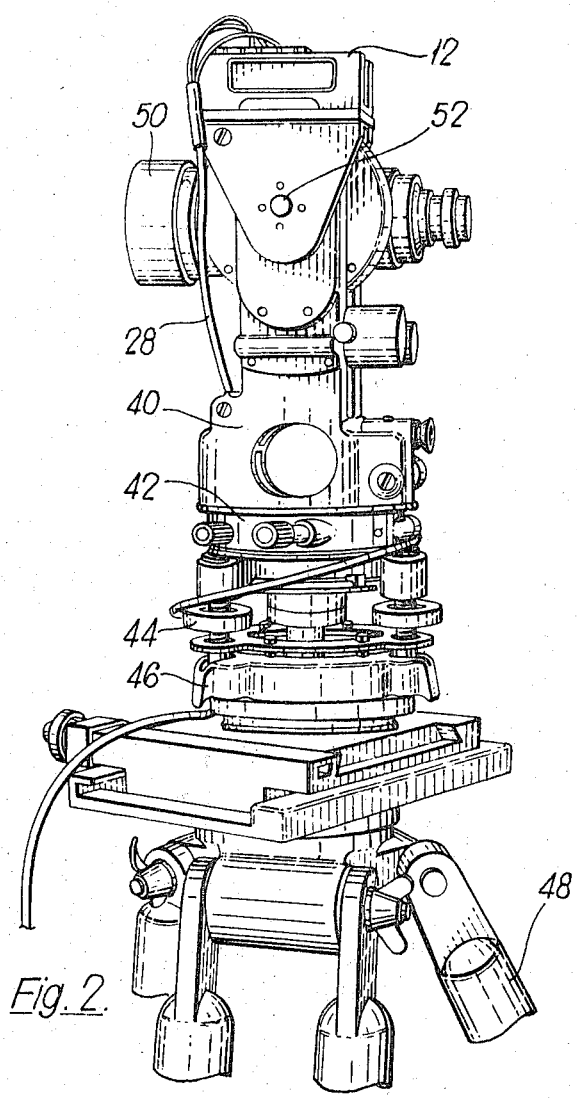
FIG. 2 is a perspective view of one theodolite.

The other two levels 12 are mounted on respective theodolites. These are shown diagrammatically in FIG. 1, and one is shown in more detail in FIG. 2 to which reference is now made.

As is well known, a theodolite includes an upper body 40 that is rotatable relatively to a lower body 42 about a substantially vertical axis. This lower body is supported by levelling screws 44 on a base 46 which is mounted on a tripod 48.

A telescope 50 is carried by the upper body 40 on a horizontal axis 52, about which the telescope can be rotated to elevate and depress the telescope.

In the present apparatus, the level 12 is secured to the upper body 40 of the theodolite in place of the customary visible bubble level.

Various uses to which this apparatus can be put will now be described.

EXAMPLE 1

One wishes to determine the relationship between the planes defined by the roller bearings supporting two pieces of equipment which can be rotated about axes which are nominally vertical when a ship is upright, for example a gun and a director. The gun and the director are pointed on the same bearing and one of the clinometers shown in FIG. 1 is placed on a horizontal reference surface on the rotatable gun mounting, while the other clinometer is placed on a horizontal reference surface on the rotatable director mounting. The clinometers are so placed on the horizontal surfaces that the directions of the sensitive axes of the levels 12, as seen in plan, are parallel to one another and to the direction in which the gun and the director are pointing. The receiver 26 is then set to take the difference between the signals from the two levels, and a record is made of the reading of the meter. Then the gun and the director are rotated through equal angles, and the reading of the meter is again recorded. This is repeated until the gun and the director have turned through a complete circle. This operation is analogous to what has hitherto been carried out by means of visible bubble levels. It has been customary to rotate the gun and director in steps of the order of 10°, and this can be done in the present case. The readings which have been recorded enable one to determine corrections which require to be made when aiming a gun in accordance with information supplied by the director.

The advantage of this procedure over previous procedures is that one operator can take all the readings, and, because these readings are all the result of taking differences between the signals from the two levels, they are not affected by bodily motion of the ship (this is assuming that the motion is not so violent as to introduce substantial accelerations, nor so extensive as to cause the levels to operate beyond the range at which there is a linear relationship between tilt and signal).

It is possible that the ship may have an angle of list such that the levels, if placed directly on the surfaces, would reach the end of their available range. Since the levels are mounted on clinometers, if such a situation develops, then both clinometers can be inclined to an equal extent, with no effect on the difference readings recorded from the receiver.

With previous procedures, using bubble levels observed visually, it has been necessary to fix the ship in a particular attitude by shoring up in a dock. With the use of the present invention, the ship can be fully afloat, and even at sea in reasonably calm water, and it is also possible for loading to be in progress, so that the rim of the ship is changing.

EXAMPLE 2

The two levels mounted on theodolites are used to determine the relative alignment of a piece of equipment and its datum, where the datum is not in direct sight of the piece of equipment.

For this purpose, one theodolite is stood in a convenient position in view of the datum, and the other theodolite is stood in a convenient position in view of the piece of equipment. Then, by the use of the present invention, the two theodolites are aligned with one another. This is described below. Once this alignment has been achieved, then information is obtained optically, by methods which are no part of the present invention, as to the relative alignment of the first theodolite and the datum on the one hand and of the second theodolite and the piece of equipment on the other hand.

Usually the datum and the piece of equipment already have on them indications of a datum direction, and these two indications are substantially parallel. By optical observation, the two theodolites are rotated about their vertical axes so as to be pointing in these datum directions. The level on the theodolite adjacent to the datum is regarded as a master level. The levelling screws on the other theodolite are adjusted until the difference of the signals from the two levels as displayed by the receiver is zero. Then the upper body of each theodolite is turned through 90° about the respective substantially vertical axis, and the level screws of the theodolite adjacent to the equipment are again adjusted until the difference between the signals is zero. These operations may be repeated to achieve sufficient accuracy.

The ship is then given a deliberate tilt, for example by moving ballast to one side until the roll is of the order of 3 degrees. The connections at the receiver are altered to display the signal from the level adjacent to the datum only. The upper body of the theodolite carrying this level is rotated about the substantially vertical axis until the signal from the level is substantially zero. The position of this theodolite is locked. Then the switching is altered to display the difference in signals from the two levels, and the upper body of the other theodolite is turned about its substantially vertical axis until the difference is exactly zero. Under this condition, the telescopes of the two theodolites are parallel to one another as considered in plan. This second theodolite is also locked, and then use is made of a provision which is usual in theodolites, to enable a scale indicating rotation about a vertical axis to be released and set to read zero on both theodolites.

This having been done, the ship can be restored to a normal attitude, and the theodolites can be set parallel to each other in plan in any desired direction simply by ensuring that both scales have the same reading.

In each of these examples, the apparatus used comprises two instruments each of which has a sensitive axis and gives an electrical signal which, for a range of attitudes, is a function of the magnitude of the angle between that axis and the direction of the earth's gravitational field at any moment, means for rotating each instrument about an axis which is approximately vertical, a central receiver, and means for transmitting the signals from the instruments to the receiver, the receiver containing means for taking the instantaneous difference of the signals, and means for displaying or recording that difference.

In Example 1 the means for rotating each instrument is part of the mounting for the equipment and thus is secured to the ship, whereas in Example 2 the means for rotating each instrument is within the theodolite, and thus is portable.

I claim:

1. A method of obtaining information for use in establishing the alignment of equipment on a structure, using instruments each of which has a sensitive axis and gives an electrical signal which, for a range of attitudes, is a function of the magnitude of the angle between that axis and the direction of the earth's gravitational field at any moment, the method comprising:
    a. installing a first such instrument on the structure, either on a first mounting or on a piece of equipment, with provision for rotation of the instrument relatively to the structure about a rotation axis which is approximately vertical, the sensitive axis being perpendicular to this rotation axis,
    b. likewise installing a second such instrument on said structure on a second mounting or piece of equipment,
    c. bringing the two instruments to rotational positions about their rotation axes each with its sensitive axis approximately aligned with a common direction in the structure, and taking the instantaneous differencee of the signals of the two instruments, thereby obtaining an output the magnitude and polarity of which varies in accordance with the magnitude and polarity of the angle between the rotation axes when projected onto the vertical plane containing the common direction,
    d. thereafter rotating each instrument about its respective rotation axis in the same polarity through the same angle, and again taking the instantaneous difference of the signals of the two instruments,
    e. adjusting at least one mounting or piece of equipment, having regard to the differences taken under steps (c) and (d), so as to bring the rotation axes into exact parallelism,
    f. tilting the structure about a horizontal axis into an inclined attitude such that the rotation axes are substantially out of the vertical,
    g. taking the instantaneous difference of the signals of the two instruments while the structure is in this inclined attitude, and
    h. rotating one of the instruments about its rotation axis until the difference is zero.

* * * * *